United States Patent [19]
Savazzi

[11] Patent Number: 5,930,143
[45] Date of Patent: Jul. 27, 1999

[54] EQUIPMENT FOR MEASURING THE DIMENSIONS OF TOOLS OF MACHINES FOR MECHANICAL WORKING

[75] Inventor: Ezio Savazzi, Cusano Milanino, Italy

[73] Assignee: Fidia S.p.A., Turin, Italy

[21] Appl. No.: 08/942,537

[22] Filed: Oct. 1, 1997

[30] Foreign Application Priority Data

Oct. 2, 1996 [IT] Italy .................................. TO96A0804

[51] Int. Cl.[6] .......................... G05B 19/401; G01B 11/02
[52] U.S. Cl. ............................... 364/474.37; 364/474.17; 356/387
[58] Field of Search ........................ 364/167.05, 167.12, 364/474.08, 474.15–474.19, 474.2, 474.34, 474.37; 356/387, 376, 384; 702/34; 408/16

[56] References Cited

U.S. PATENT DOCUMENTS

| | | | |
|---|---|---|---|
| 4,031,368 | 6/1977 | Colding et al. | 364/474.15 |
| 4,966,460 | 10/1990 | Kahley | 356/387 |
| 5,084,827 | 1/1992 | Demesy et al. | 364/474.37 |

FOREIGN PATENT DOCUMENTS

| | | |
|---|---|---|
| 4126405 | 2/1993 | Germany . |
| WO9010192 | 9/1990 | WIPO . |

*Primary Examiner*—William Grant
*Assistant Examiner*—Steven R. Garland
*Attorney, Agent, or Firm*—Sughrue, Mion, Zinn, Macpeak & Seas, PLLC

[57] ABSTRACT

The equipment comprises a main support structure fixable close to the machine and in which a laser source is mounted, and a receiver for providing electrical signals indicative of the strength of laser radiation received. The receiver, in use, is located facing the source at a predetermined distance therefrom so that a field of measurement is defined between them across which the laser beam extends and in which a tool to be measured is movable so as to intercept the laser beam. The receiver is carried by an auxiliary structure connected to the main support structure and movable relative thereto between a retracted rest position, in which the structures present a minimum overall bulk and an extended working position in which the receiver is located facing the source.

18 Claims, 7 Drawing Sheets

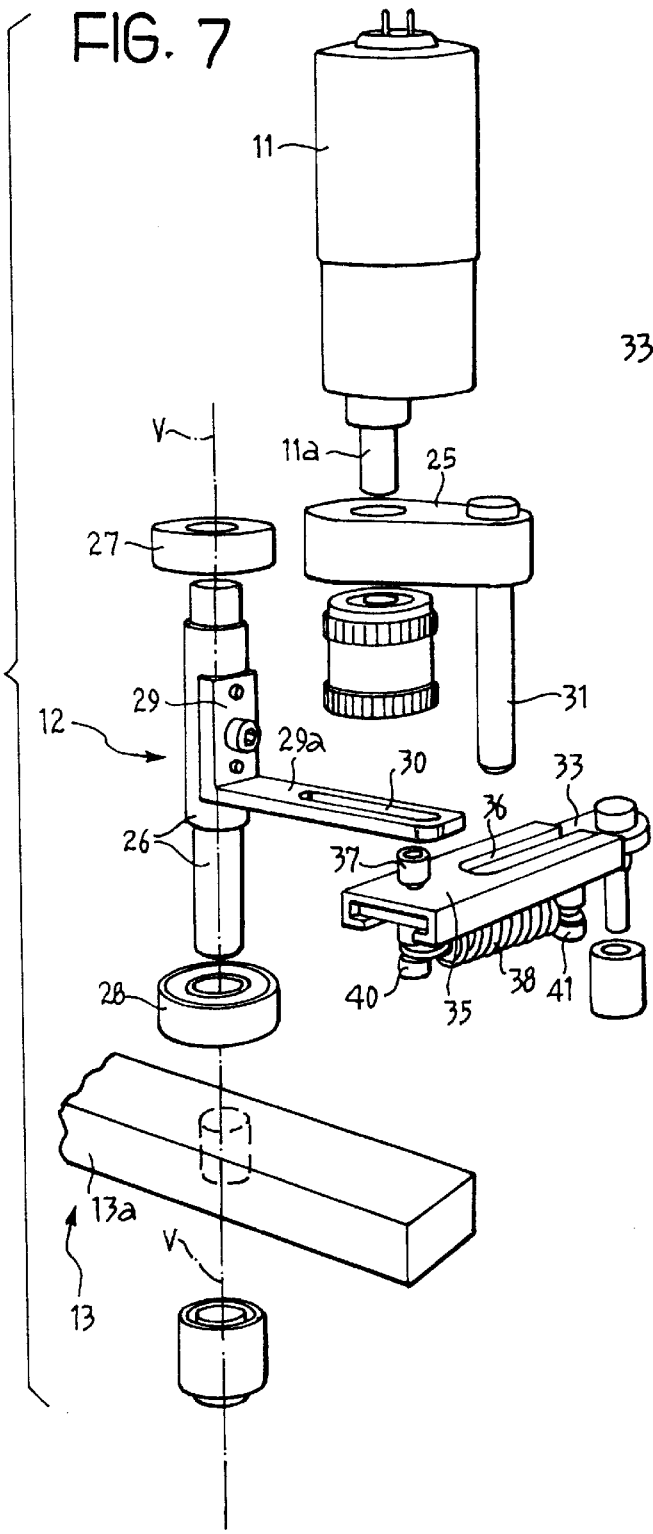
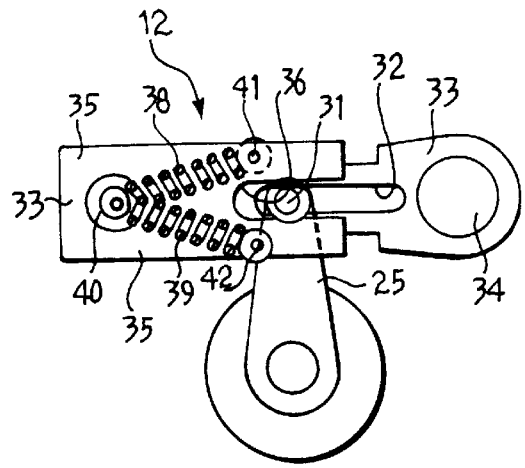
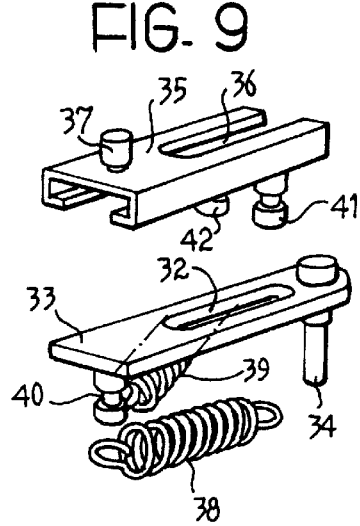

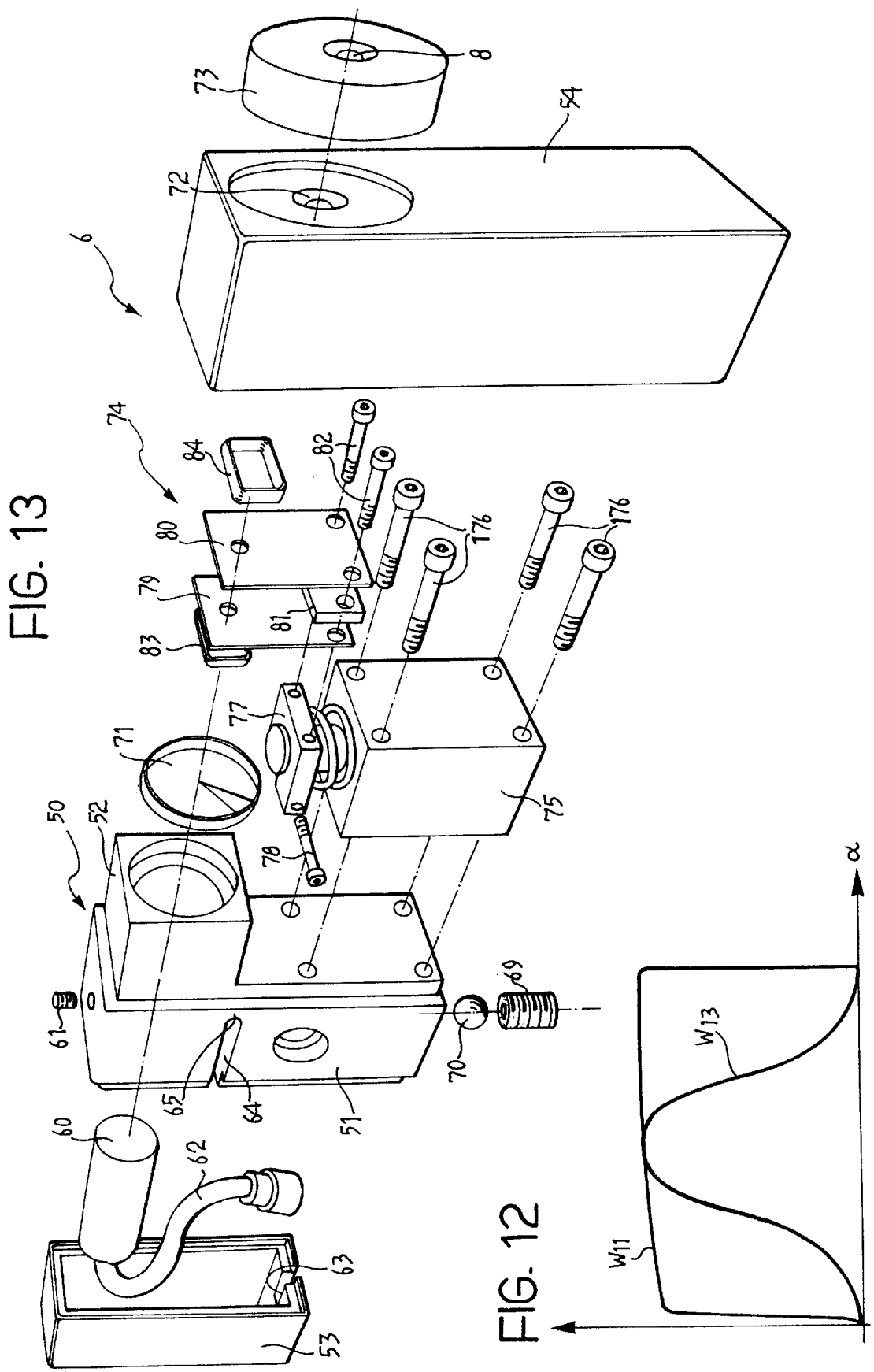

EQUIPMENT FOR MEASURING THE DIMENSIONS OF TOOLS OF MACHINES FOR MECHANICAL WORKING

BACKGROUND OF THE INVENTION

The present invention relates to equipment for measuring the dimensions of tools of machines for mechanical working.

More specifically the invention provides equipment of the type comprising a support structure fixable close to the machine and in which a laser source is mounted, and a receiver for providing electrical signals indicative of the strength of laser radiation received; the receiver, in use, being located facing the source at a predetermined distance therefrom so that a field of measurement is defined between them across which the laser beam extends and in which a tool to be measured is movable so as to intercept the laser beam.

Prior art equipment of this type includes a laser source and an associated receiver mounted in respective fixed positions facing each other. The laser source and the receiver are typically fixed to the work surface of a numerically controlled machine tool. An electronic control connected to the control unit of the machine enables the dimensions of the tools to be measured periodically, for example in order to determine their diameter or wear or to detect any fractures in a tool. For this purpose the movable part of the machine which carries the tool to be measured is moved so that the tool at least partly intercepts the laser beam between the source and the receiver. The dimensions of the tool are determined by known methods, for example by detection of the positions of the tool holder when the tool intercepts the laser beam in one direction and then in the opposite direction.

The laser beam used may be collimated or focused.

The known equipment, in which the source and the receiver are installed in respective fixed, mutually facing positions, has the disadvantage that it occupies a significant proportion of the work surface of the machine tool to which it is attached. This problem may be avoided if the entire equipment is mounted on a movable support structure which enables the source and the receiver to be brought into the work zone of the machine tool when it is necessary to carry out a measurement. This solution however has the disadvantage of requiring micrometric precision in the movement of the source-receiver complex which, intrinsically, is extremely costly.

SUMMARY OF THE INVENTION

An object of the present invention is therefore to provide equipment of this type which avoids the problems of prior art equipment, indicated above, in a simple and relatively inexpensive manner.

This and other objects are achieved according to the invention by equipment for measuring the dimensions of a tool of a machine for mechanical working, comprising a main support structure fixable close to the machine and in which a laser source is mounted, and a receiver for providing electrical signals indicative of the strength of laser radiation received; the receiver, in use, being located facing the source at a predetermined distance therefrom so that a field of measurement is defined between them across which the laser beam extends and in which a tool to be measured is movable so as to intercept the laser beam;

the receiver being carried by an auxiliary structure connected to the main support structure and movable relative thereto between a retracted, rest position, in which the structures present a minimum overall bulk, and an extended working position in which the receiver is located facing the source;

drive means being connected to the auxiliary structure for moving it between the rest position and the working position, wherein the auxiliary structure includes an arm connected to the main support structure so as to be pivotable about a substantially vertical axis.

BRIEF DESCRIPTION OF THE DRAWINGS

Further characteristics and advantages of the invention will become apparent from the detailed description which follows, given purely by way of non-limitative example, with reference to the appended drawings, in which:

FIG. 7 is an exploded perspective view of the drive mechanism shown in FIG. 6;

FIG. 8 is a plan view from below of part of the mechanism of FIGS. 6 and 7;

FIG. 9 is an exploded perspective view of the part of the mechanism shown in FIG. 8;

FIG. 12 is a graph showing changes in the angular velocity of the shaft of a motor of the mechanism of FIGS. 6 and 7 and in the angular velocity of the arm driven by this mechanism as a function of time;

FIG. 13 is an exploded perspective view of the support structure for the laser source.

DETAILED DESCRIPTION OF THE INVENTION

Figure 1:
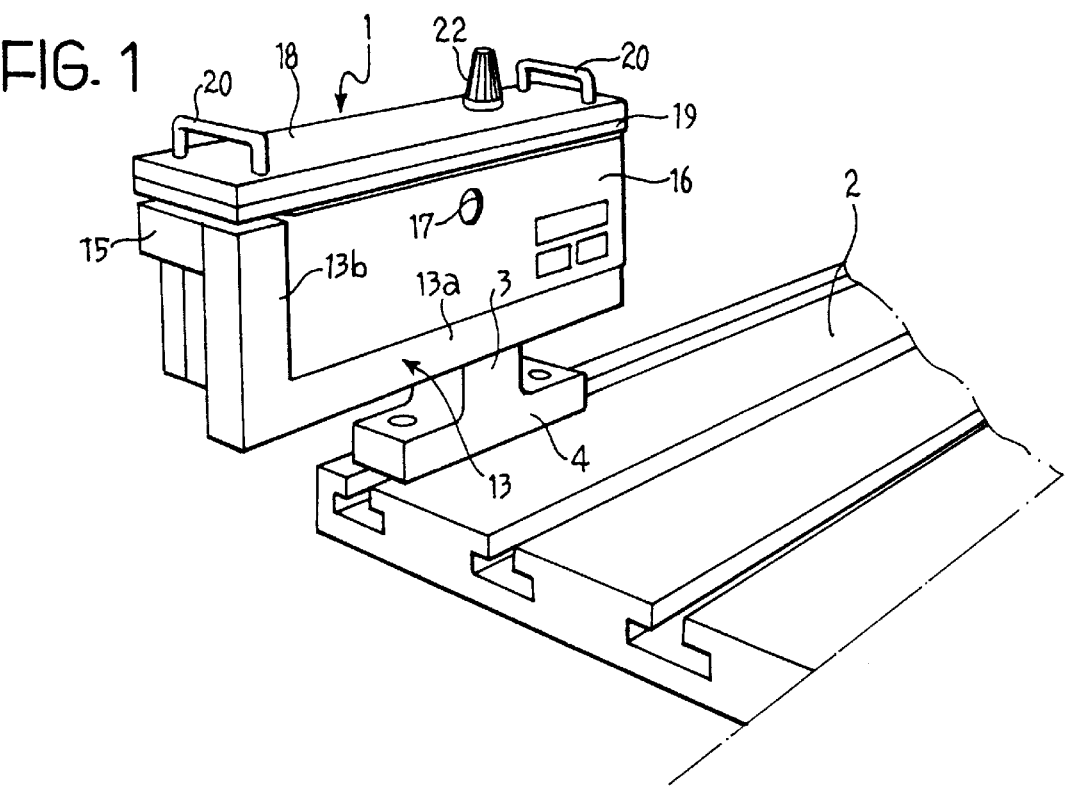
FIG. 1 is a perspective view of equipment according to the invention shown in a rest condition.

Equipment according to the invention generally indicated 1 is fixed to a corner of a work surface 2 of a machine tool of known type, for example a numerically controlled milling machine.

The equipment 1 includes a support 3, conveniently made, for example, in massive metal, the bottom of which is formed as a foot 4 with two wings each fixed to the work surface 2, for example by bolts.

Figure 3:
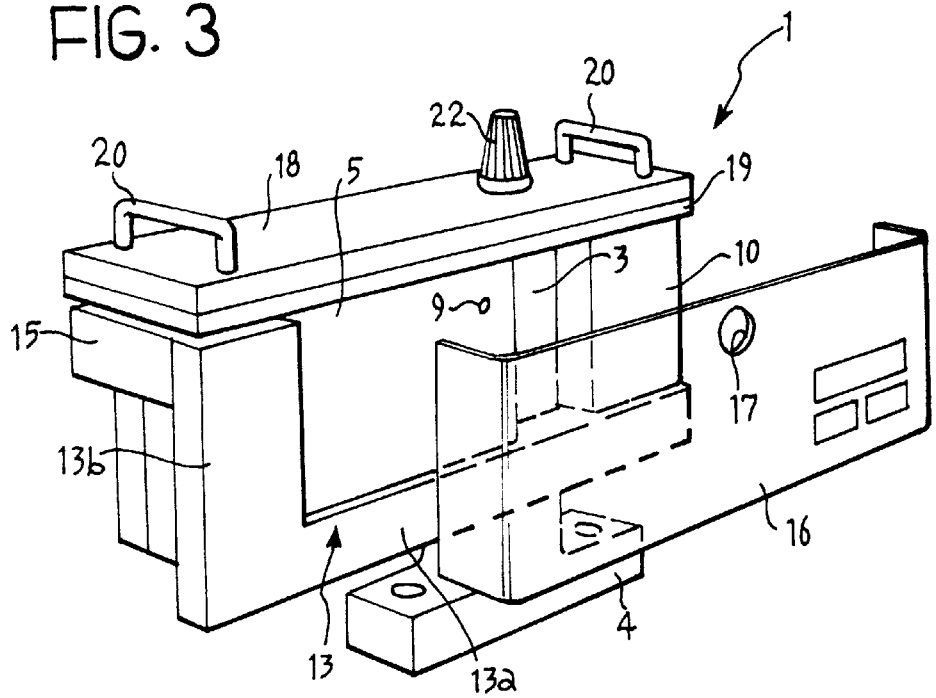
FIGS. 3 and 4 are partially exploded perspective views showing the structure of the equipment of FIGS. 1 and 2.

As seen in FIG. 3, to one side of the support 3 is fixed an essentially parallelepipedal-shaped casing 5. In the embodiment illustrated, this casing (FIG. 4) comprises a container 5a fixed to the support 3 and an associated front closure element 5b. Within the casing, adjacent the support 3, is fixed a laser source generally indicated 6 in FIGS. 4 and 5.

Figure 4:
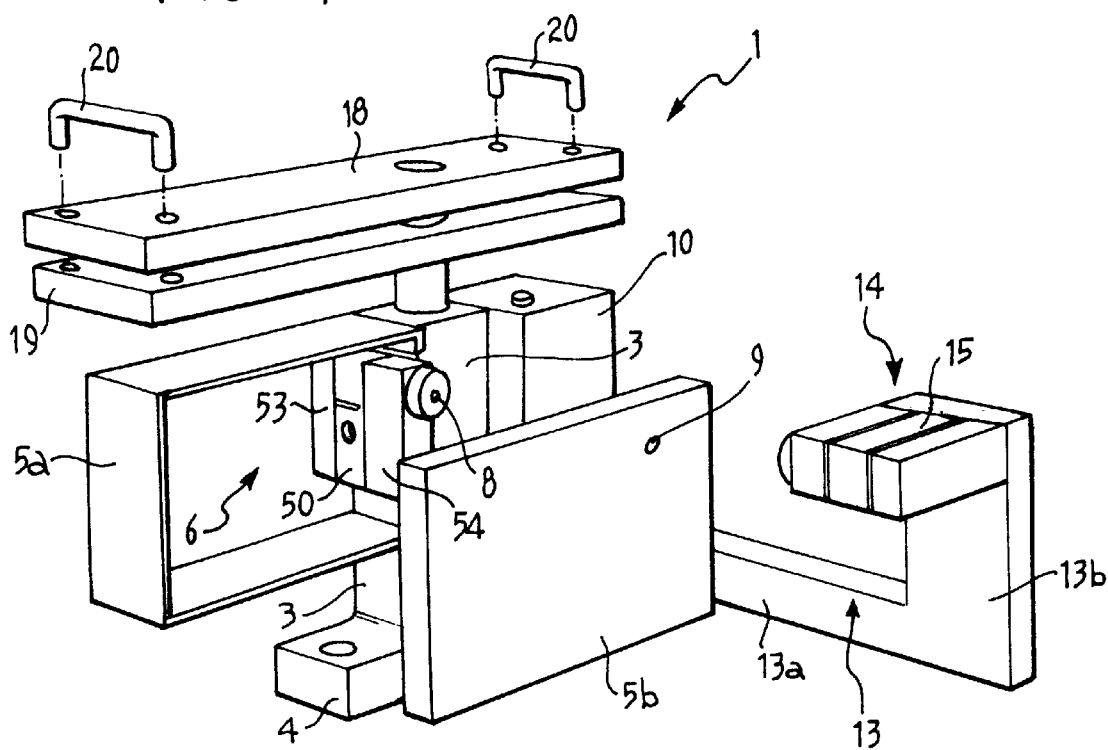
Figure 5:
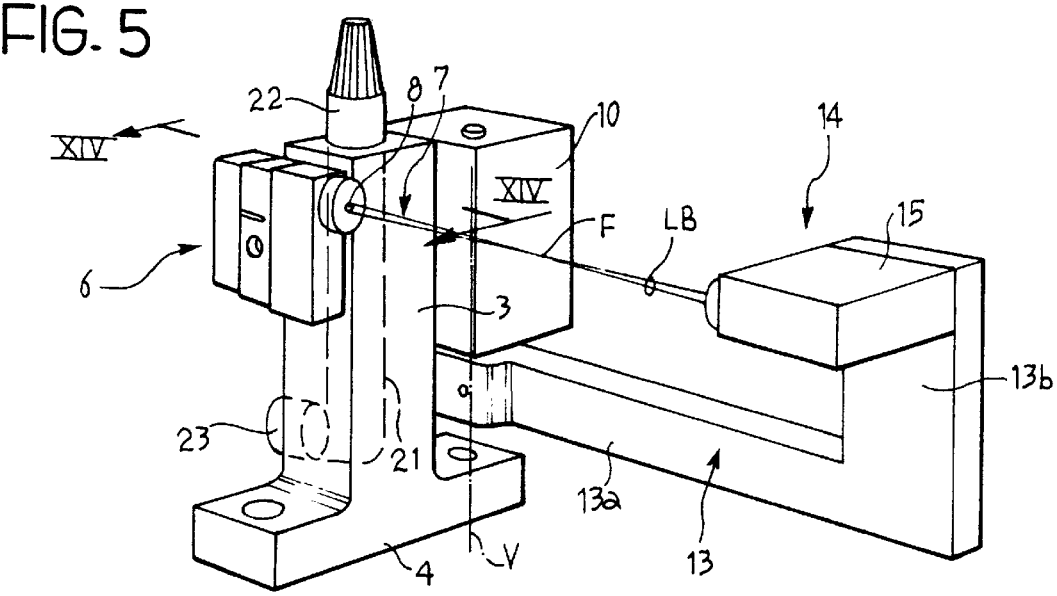
FIG. 5 is a perspective view of part of the equipment shown in the preceding Figures.

In use, this source emits a focused laser beam (indicated 7 in FIGS. 2 and 5) which travels in a generally horizontal direction through an outlet aperture, indicated 8 in FIGS. 4 and 5, of the source housing.

The front closure element 5b of the casing 5 in turn has an aperture 9 facing the outlet aperture 8 of the laser source 6 (FIGS. 3 and 4).

The remaining space within the casing 5 is conveniently used for housing electronic circuits (not illustrated) for controlling and treating signals.

A casing 10 (FIGS. 3 and 4) housing an electric motor 11 and associated drive transmission mechanism 12 (FIG. 6) is fixed to the opposite side of the support 3 with respect to the casing 5.

This mechanism couples the output shaft of the motor 11 to an arm 13 which is pivotable about a vertical axis indicated V in FIGS. 5, 6, 10 and 11.

In the embodiment illustrated by way of example, the arm 13 is substantially L-shaped, having a main arm 13a extending horizontally and a minor arm 13b extending vertically.

The arm 13 is movable between a rest position (FIGS. 1, 3, 6, 10) and a working position (FIGS. 2, 4, 11) separated by an angle of about (for example) 90°.

To the upper end of the portion 13b of the arm 13 is fixed a receiver, generally indicated 14, enclosed in an essentially parallelepipedal-shaped structure 15.

Figure 2:
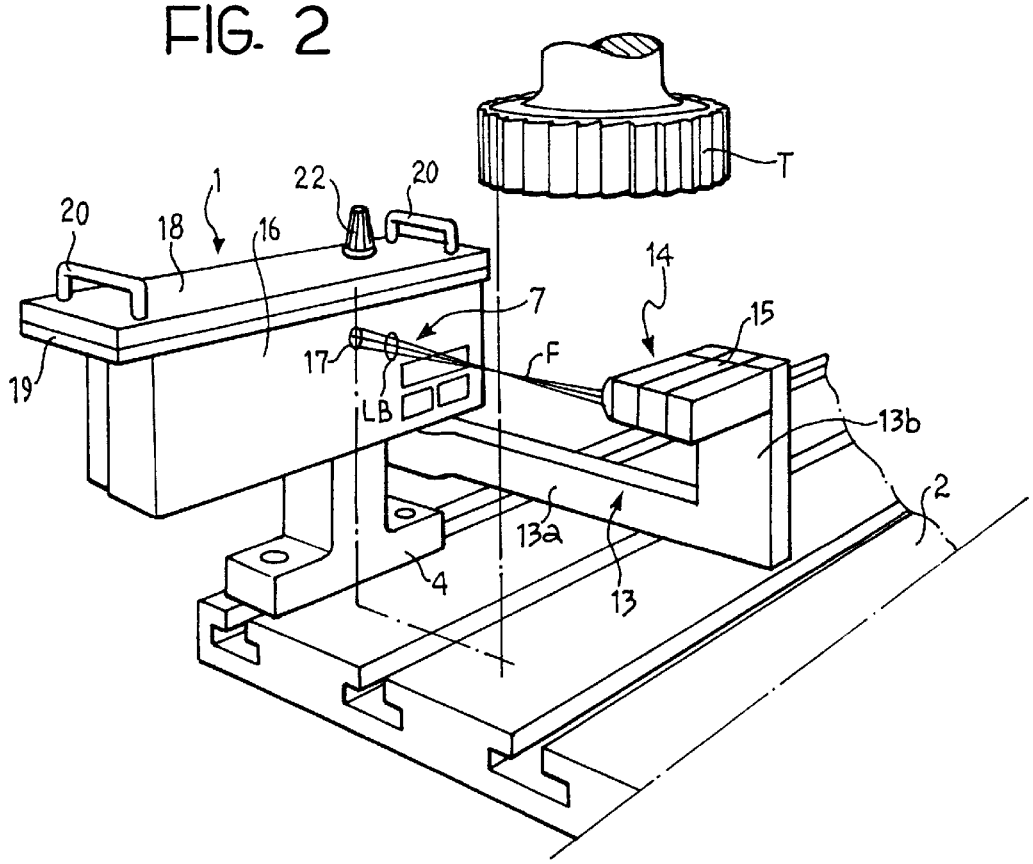
FIG. 2 is a perspective view of the equipment of FIG. 1 showing it in an operative or working condition.

A substantially C-shaped front closure panel indicated 16 in FIGS. 1 to 3, encloses, or partially surrounds, the complex formed by the casings 5 and 10. The panel 16 has an aperture 17 in its main face in alignment with the aperture 9 in the closure element 5, and hence with the outlet aperture 8 of the laser source 6.

The arm 13 is shaped so that, when it is in its rest position (FIGS. 1 and 3), its horizontal portion 13a extends beneath and adjacent the complex formed by the casings 5 and 10 and the associated panel 16 while the portion 13b extends along one side of this complex, occupying therewith a volume which is substantially parallelepipedal in shape overall. When the arm 13 is in its rest position, the equipment 1 thus has a minimum overall bulk.

In its working position (FIGS. 2, 4, 5), the arm 13 extends substantially perpendicular to the main face of the panel 16 and the receiver 14 faces the laser source 6 through the aperture 9 in the closure element 5b of the casing 5 and the aperture 17 in the front panel 16.

The laser source 6 is arranged to emit a laser beam LB focused at a point F intermediate the position of the source 6 and the position occupied by the receiver 14 when the arm 13 is in its working position.

The region between the receiver 14 and the outlet aperture 17 of the laser beam LB defines the field of measurement of the equipment, in which a tool to be measured, such as, for example, the mill T shown in FIG. 2, is movable so that the tool at least partially passes through or intercepts the laser beam itself.

As is apparent from FIGS. 1 to 4, the equipment 1 is surmounted by a pair of massive plates 18 and 19 of essentially rectangular shape located over the complex formed by the casing 5, the support 3 and the casing 10. The function of these plates is to protect the equipment mechanically from any impacts by tools or other objects in the working zone. Two grips or handles 20 are fixed to the tops of the plates 18 and 19 to facilitate the movement and positioning of the equipment.

The plates 18 and 19 are suitably of such a size that their ends overlie and protect the receiver 14 when the arm 13 is in its rest position (FIGS. 1 and 3).

As seen in FIG. 5, an axial duct 21 is conveniently formed in the support 3 of the equipment so as to open into the upper face of the support where a nozzle 22 is fixed. The lower end of the duct 21 is curved so that the duct opens into the rear face of the support 3 close to a connector 23 (FIG. 5) intended for connection to a compressed air source.

The nozzle 22 is sufficiently long to extend through corresponding apertures in the protective plates 18, 19 and project above them, as seen for example in FIGS. 1 to 3.

In use, the nozzle 22 enables a jet of compressed air to be emitted upwardly for use, for example, to "dry" a tool, the dimensions of which are to be measured, before the measurement itself is carried out by means of the laser beam LB.

This "drying" is particularly useful in the case of liquid-cooled tools in order to eliminate the effect of a surface film or droplets of this liquid on the measurement.

Figure 6:
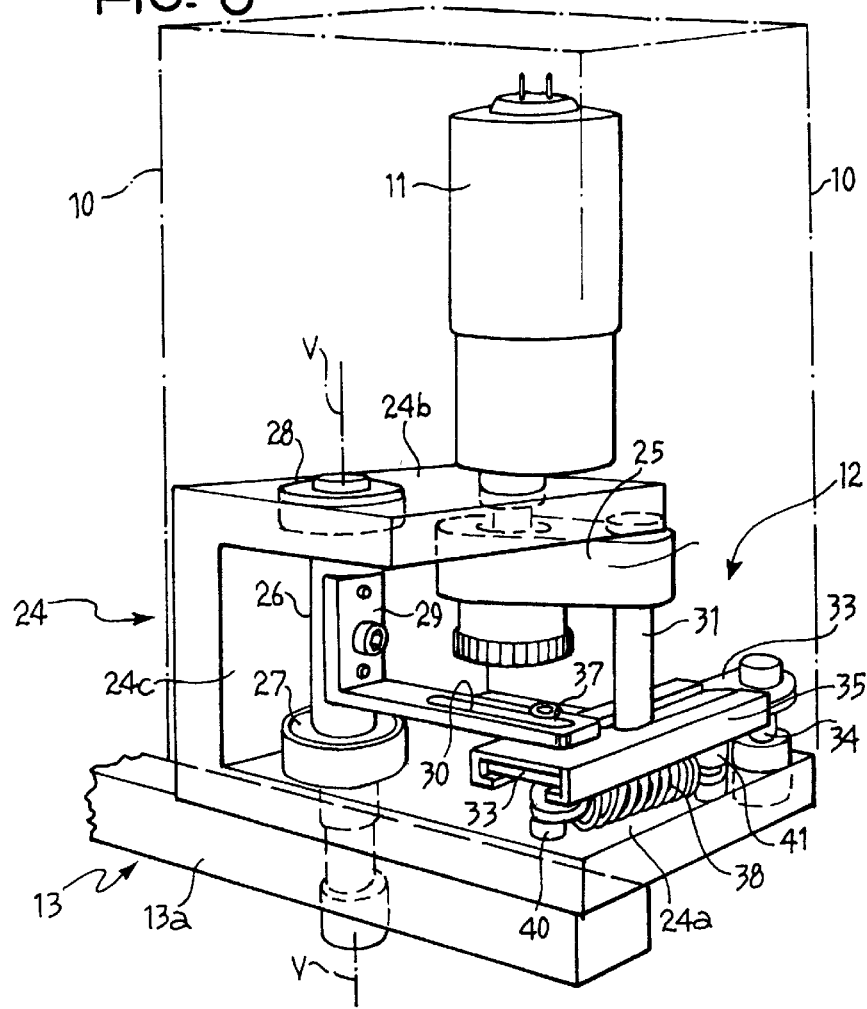
FIG. 6 is a perspective view of a drive mechanism for moving an arm in the equipment of the invention.

With reference to FIG. 6, in the embodiment shown here by way of example, a support structure is provided in the casing 10 which comprises a bracket 24 having a lower horizontal limb 24a and an upper horizontal limb 24b connected together by a vertical limb 24c. The electric motor 11 is fixed above the limb 24b of the bracket 24 with its shaft 11a extending vertically downwardly through this arm, beyond which it is connected to one end of a crank 25 (see also FIG. 7).

Reference 26 indicates a journal rotatable about the vertical axis V between two support bearings 27 and 28 carried by the limbs 24a and 24b of the bracket 24. The journal 26 passes through the lower limb 24a and its portion which projects beneath this limb is fixed to the portion 13a of the arm 13.

The journal 26 carries an L-shaped member 29 which has a horizontal arm 29a formed with an elongate slot 30.

The end of the crank 25 opposite that fixed to the shaft of the motor 11 carries a journal 31 which extends downwardly parallel to the axis of the shaft of the motor 11 and the axis V of the journal 26.

The journal 31 extends into a slot 32 in a member 33 rotatable in a horizontal plane about the axis of a pin 34 supported for rotation by the lower limb 24a of the bracket 24.

A further member 35, of essentially channel-shape, is slidably mounted on the member 33 and has a deep slit 36 which leaves the slot 32 in the member 33 uncovered. The end of the member 35 furthest from the pin 34 carries a spigot 37 on its upper surface, this spigot being engaged in the slot 30 in the L-shaped member 29 which is fixed to the journal 26.

Two helical springs 38 and 39 each have a respective end anchored to a spigot 40 fixed to the distal end of the member 33 and their other ends fixed to two spigots 41 and 42 carried by the end of the member 35 closest to the pin 34, one on either side of the slit 36 in this member.

Figure 10:
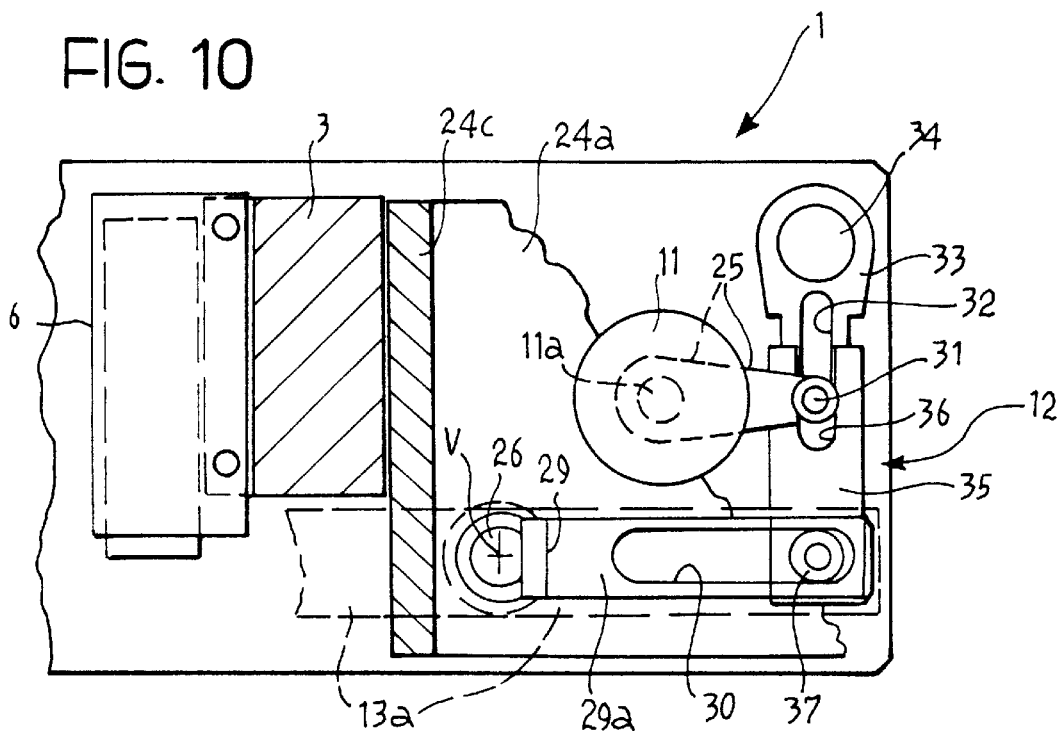
FIGS. 10 and 11 are partial plan views of the equipment of the invention with the mechanism of FIGS. 6 to 9 in two different operative conditions.
Figure 11:
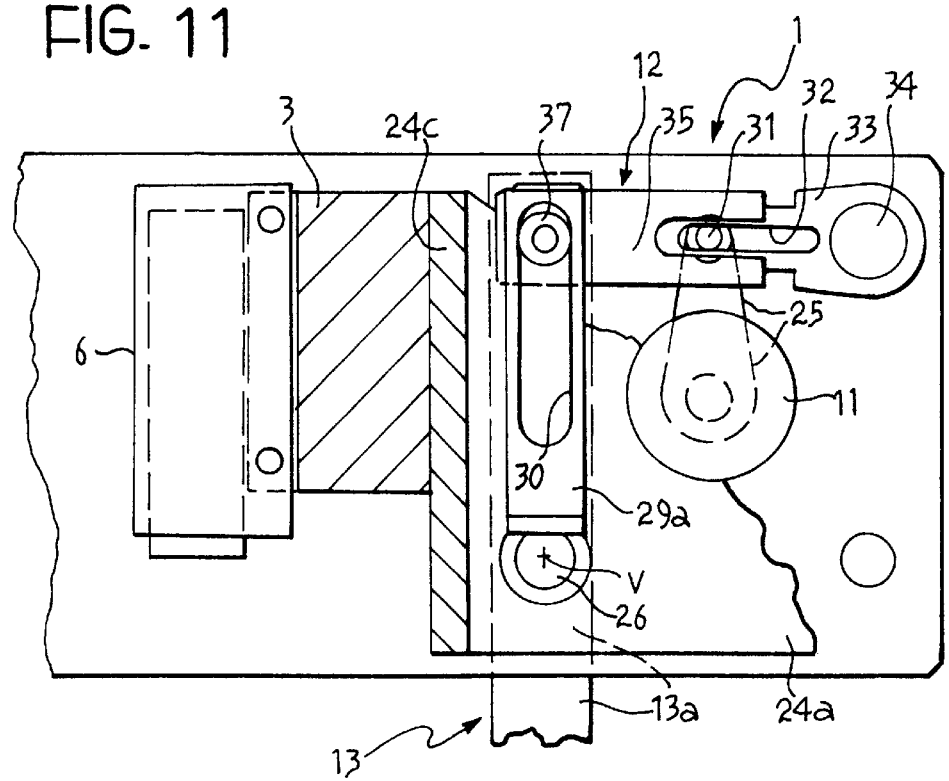

Preferably, as seen in FIGS. 10 and 11, the axes of rotation of the shaft of the motor 11, of the journal 26 and of the pin 34 are coplanar (as well as, necessarily, being parallel).

The drive mechanism described above, which couples the shaft of the electric motor 11 to the rotatable arm 13 of the equipment operates as follows.

In FIGS. 6 and 10, this mechanism is shown in the condition assumed when the arm 13 is in its rest position. In this condition, the crank 25 and the arm 29a of the member 29 are essentially parallel to each other and to the portion 13a of the arm 13. The members 33 and 35, slidingly coupled together, extend in a direction essentially perpendicular to that of the portion 13a of the arm 13 and the springs 38 and 39 are preloaded so as to oppose further copenetration of these members.

Starting from the condition shown in FIGS. 6 and 10, when the electric motor 11 is actuated, its shaft 11a rotates in an anticlockwise sense (for an observer of FIG. 10) and the crank 25, through the journal 31, causes the unit formed by the members 33 and 35 to rotate (in the clockwise sense). This unit in turn drives the rotation (in an anticlockwise sense) of the member 29 and the associated journal 26 and hence of the arm 13 which starts to leave its rest position and to move towards its working position.

During this rotation, the journal 31 is free to slide in the slot 32 in the member 33 while the spigot 37 is free to slide in the slot 30 in the member 29.

When the arm 13 reaches its working position (FIG. 11), the crank 25 and the member 29, as well as the arm 13, are again essentially parallel to each other but at about 90° to their orientation in the rest condition. The unit formed by the members 33 and 35 is at approximately 90° to the direction of extent of the arm 13 and the springs 38 and 39 again oppose further copenetration of these members.

The deactivation of the electric motor 11 when the arm 13 reaches its working position may be controlled, for example, by optical position sensors, not shown.

The springs 38 and 39 associated with the members 33 and 35 ensure that the load acting on the arm 13 in the rest and working positions is repeatable. These springs tend to hinder any movement of the arm away from the working position or from the rest position.

The drive mechanism described above enables the arm 13 to be moved from its rest position to its working position and vice versa in accordance with a predetermined law of variation of its angular velocity, whereby this movement occurs at an angular velocity which is reduced progressively as the arm nears its desired position (working or rest).

The variations in the angular velocities $\omega_{11}$ and $\omega_{13}$ of the shaft of the electric motor 11 and of the arm 13 as a function of their angular positions are shown qualitatively in FIG. 12. As seen in this drawing, the angular velocity of the arm 13 varies almost sinusoidally while the angular velocity of the shaft of the motor 11 is almost constant between the travel-limit positions. The angular velocity of this arm 13 is initially relatively small at the beginning of the movement, increases to a maximum about half-way through the angular travel and then reduces again progressively in the second half of the travel towards the final position.

This velocity profile of the arm avoids or at least limits drastically any oscillation of the arm, particularly at the start of the movement and when the travel-limit positions are reached.

A preferred structure of the laser source 6 will now be described with reference to FIGS. 13 to 15.

In the embodiment illustrated in these drawings, the laser source 6 includes a support structure 50, for example of aluminium or other metal, of substantially L-shape, with a vertical main arm 51 and a horizontal arm 52.

Two shells 53 and 54 are connected to the structure 50 on opposite sides thereof with the interposition of respective sealing washers 55 and 56. Two chambers, indicated 57 and 58 in FIGS. 14 and 15, are thus defined between the shells and the intermediate support structure 50.

The intermediate support structure 50 has an axial passage 59 in its upper part which houses a laser emitter 60, the casing of which is clamped by a grub screw 61. The supply cable 62 for the laser emitter 60 extends through the chamber 57 and exits through an aperture 63 in the shell 53 (FIG. 13).

The intermediate support structure 50 has a horizontal slot 64 in its region connecting the upper horizontal arm 52 and the lower vertical arm 51, which slot extends from the rear face of this structure to a position close to the front face of the arm 51, adjacent which, in the zone indicated 65, is defined a sort of integral resilient hinge.

Figure 14:
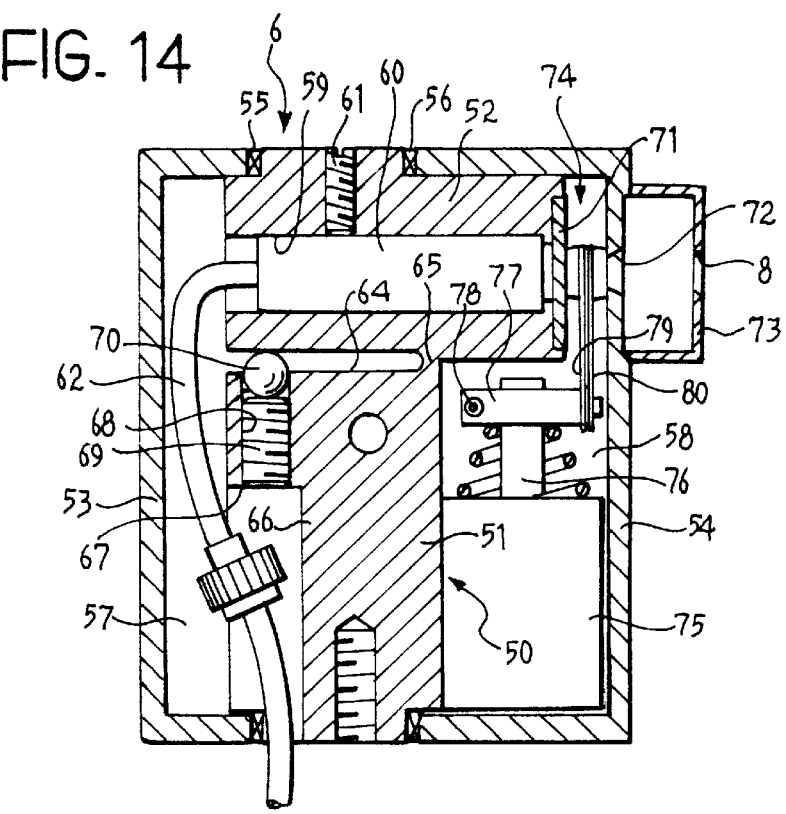
FIGS. 14 and 15 are sectional views taken on the line XIV—XIV of FIG. 5 showing two different conditions of the laser emitter and an associated cleaning device.
Figure 15:
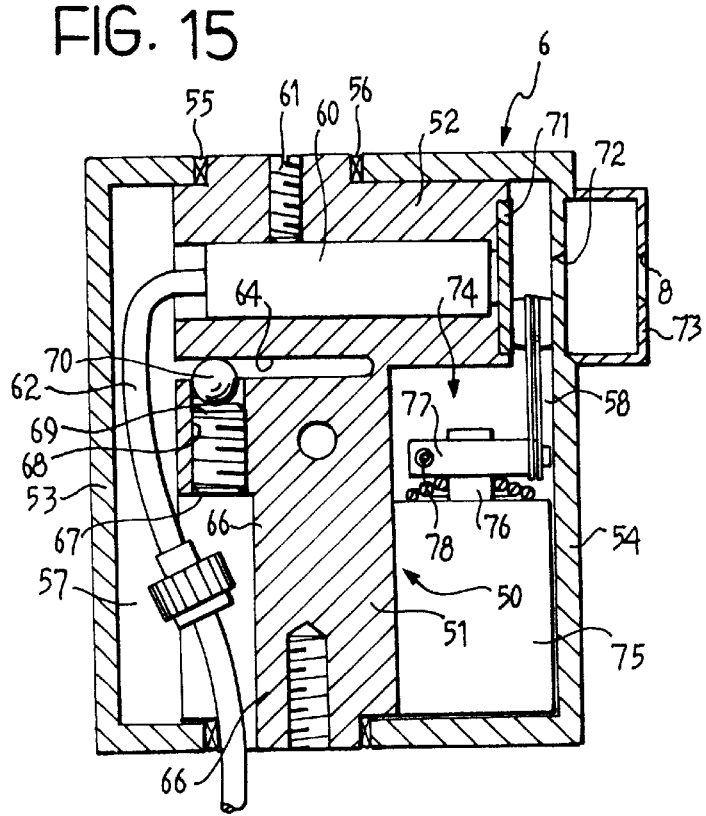

As best seen in FIGS. 14 and 15, a vertical channel 66 is formed in the vertical rear face of the vertical arm 51 of the structure 50, the upper end of this channel terminating at a horizontal face 67. A threaded hole 68 extends from this face to the slot 64 and is engaged by a grub screw 69. A small ball head 70 is located between the upper end of the screw 69 and the upper face or surface of the slot 64.

The arrangement is such that a micrometric movement of the ball 70 can be effected by rotation of the screw 69 so as to cause the upper arm 52 of the support structure 50 to pivot relative to the vertical arm 51 about the hinge zone 65. This enables the orientation of the laser beam emitted by the emitter 60 to be calibrated very precisely in the vertical plane.

A transparent disc 71, for example of crystal, is fixed in a seat in the end of the arm 52 of the support structure 50 in front of the emitter 60.

The shell 54 has an aperture 72 facing the central zone of the transparent disc 71 and the laser emitter 60. A protective element 73 of substantially cup-shape is fixed to the outside of the shell 54 around this aperture and has a central aperture 8 which acts as an outlet aperture for the laser beam.

The chamber 58 formed between the shell 54 and the support structure 50 houses an obturator/cleaning device generally indicated 74. This device includes an electromechanical actuator 75, such as a solenoid, fixed to the vertical arm 51 of the support structure 50 by screws 176 (FIG. 13). This actuator includes a vertically movable shaft to the top of which is fixed a plate 77. In the embodiment illustrated, this plate 77 is substantially C-shaped and extends around the upper end of the shaft 76, the ends of its arms being clamped together by an adjustment screw 78.

The lower ends of a pair of parallel leaf springs 79 and 80 are fixed to that side of the plate 77 facing the shell 54 with the interposition of a spacer plate 81. The fixing is achieved by means of screws indicated 82 in FIG. 13.

To the upper ends of the springs 79 and 80 are fixed respective wiper members 83 and 84, for example of elastomeric material, preferably having the same shape.

The wiper member 83 has a peripheral annular lip which bears on that face of the transparent disc 71 facing the shell 54. The wiper member 84 has a similar lip which bears on the inner surface of that face of the shell 54 in which the aperture 72 is formed.

The arrangement described above is such that, when the actuator 75 is deactivated, the wiper members 83 and 84 are disposed in the positions shown in FIG. 14: the wiper member 83 bears on the central region of the transparent disc 71 while the lip of the wiper member 84 surrounds the aperture 72. In this condition, the outlet path of the laser beam is obstructed.

When the actuator 75 is energized, the shaft 76 is drawn downwardly and the wiper members 83, 84 are moved into the positions shown in FIG. 15 in which they are clear of the optical path of the laser beam generated by the emitter 60.

The periodic energization and de-energisation of the actuator 75 effectively cleans the transparent disc 71 of dust and vapor which may be deposited thereon in use of the equipment. When the actuator 75 is de-energized (FIG. 14), the member 84 also effectively prevents dust from entering the chamber 58.

The dust protection is made even more effective by the fact that an intermediate chamber is formed between the exterior and the chamber 58 by the cup-shaped element 73 and the shell 54.

Infiltration of dust is also further prevented by the fact that, as described above, both the closure element 5b (FIG. 4) and the front closure panel 16 (FIG. 3) are interposed between the exterior of the equipment and the laser source.

The thickness of the wiper members 83 and 84 is conveniently selected so that, aided by the resilience of the springs 79 and 80 which carry them, they are resiliently biased towards the transparent disc 71 and the shell 54 respectively.

The plate 77 which carries the springs 79 and 80 and the associated wiper members 83 and 84 may conveniently be fixed to the shaft 76 of the actuator 75 in an angular position which is readily adjustable in order to optimise the positioning of the wiper members 83 and 84 relative to the face of the disc 71 and the inner face of the shell 54.

The receiver device 14 carried by the arm 13 may conveniently have a structure identical to that of the source 6 described above with reference to FIGS. 13 to 15; in the case of the receiver, an optical sensor (instead of a laser emitter) is fixed in the seat 59 in the intermediate support structure 50 and is intended to receive the laser beam emitted by the source and to provide electrical signals indicative of the intensity of the radiation incident thereon.

The equipment according to the invention is particularly compact and of little bulk. In particular it allows the space taken up on the work surface of the machine tool with which it is associated to be minimized, as seen in particular in FIG. 1.

As an alternative to the manner of fixing shown in FIG. 1, it is possible to connect the equipment to the outer edge of the work surface itself by suitable shaping of the foot of the upright support 3, thus reducing the useful area of this surface taken to nil.

Naturally, the principle of the invention remaining the same, the forms of embodiment and details of construction may be varied widely with respect to that described and illustrated purely by way of non-limitative example, without thereby departing from the scope of the invention, as defined in the appended claims.

What is claimed is:

1. Equipment for measuring the dimensions of a tool of a machine for mechanical working, comprising a main support structure fixable close to the machine and in which a laser source is mounted, and a receiver for providing electrical signals indicative of the strength of laser radiation received; the receiver, in use, being located facing the source at a predetermined distance therefrom so that a field of measurement is defined between them across which the laser beam extends and in which a tool to be measured is movable so as to intercept the laser beam;

the receiver being carried by an auxiliary structure connected to the main support structure and movable relative thereto between a retracted, rest position, in which the structures present a minimum overall bulk, and an extended working position in which the receiver is located facing the source;

drive means being connected to the auxiliary structure for moving it between the rest position and the working position, wherein the auxiliary structure includes an arm connected to the main support structure so as to be pivotable about a substantially vertical axis.

2. Equipment according to claim 1, wherein the main support structure is enclosed within a substantially parallelepipedal shape or volume and the auxiliary structure and the associated receiver are made and connected to the main support structure in such a manner that, in the said retracted rest position, the auxiliary structure and the receiver extend within the shape or volume occupied by the main support structure.

3. Equipment according to claim 2, wherein the auxiliary structure and the associated receiver together occupy a shape substantially complementary to that of the main support structure and, in the rest condition, these structures together assume a substantially parallelepipedal configuration.

4. Equipment according to claim 1, wherein the main support structure includes a support adapted to be fixed close to an edge of a work surface of a machine tool, the laser source and the drive means associated with the auxiliary structure being fixed to this support.

5. Equipment according to claim 1, further including nozzle means for emitting a jet of gaseous fluid in a predetermined direction for cleaning a tool before measurement.

6. Equipment according to claim 1, wherein the main structure is surmounted by at least one plate for protecting it against impacts from foreign bodies.

7. Equipment according to claim 1, wherein the drive means are arranged to move the arm with an angular velocity which varies according to a substantially sinusoidal law with variation of the angular position of the arm between the rest position and the working position.

8. Equipment according to claim 1, wherein the drive means comprise a rotary motor and an associated drive transmission mechanism including a crank connected at one end to the shaft of the motor and articulated at its other end, with play, to a first transmission member which is rotatable about an axis parallel to the axis of rotation of the arm, and a second transmission member mounted so as to be slidable relative to the first transmission member and articulated at one end, with play, to a third transmission member fixed for rotation with the arm.

9. Equipment according to claim 8, wherein the first and second transmission members have associated resilient means urging them to obstruct the movement of the arm from the working position and from the rest position and for applying a predetermined load to the arm to keep it in the said positions.

10. Equipment according to claim 8, wherein the axes of rotation of the shaft of the motor, of the first transmission member and of the arm are parallel and coplanar.

11. Equipment according to claim 1, wherein the laser source includes a support structure with a first anchoring part and a second part in which a laser emitter is mounted and adjustment means for enabling the angular position of the second part relative to the first part to be adjusted.

12. Equipment according to claim 11, wherein the first and second parts of the support structure are made integrally and are articulated together by means of an integral resilient hinge.

13. Equipment according to claim 11, wherein the laser source includes an obturator/wiper device controlled electromechanically and adapted to intercept the optical path of the laser beam.

14. Equipment according to claim 13, wherein the laser emitter has an associated transparent protective element through which the laser beam is emitted in use, and in that the obturator/wiper device includes a first member with a lip formation for cleaning part of the surface of the transparent element traversed by the laser beam by sliding contact therewith.

15. Equipment according to claim 14, wherein the laser emitter and the associated transparent protective element are housed in a casing provided with an outlet aperture for the laser beam and in that the obturator/wiper device includes a second member provided with a lip formation movable in sliding contact with the surface of the housing close to the outlet aperture between an interception position and a position in which it leaves the optical path of the laser beam free.

16. Equipment according to claim 15, wherein the first and second wiper members are carried by two leaf springs facing each other but spaced apart and fixed to a movable member of an electromechanical actuator.

17. Equipment according to claim 15, wherein an outer protective element is fixed to the casing so as to surround the outlet aperture and has a restricted aperture aligned with the outlet aperture in the direction of propagation of the laser beam.

18. Equipment according to claim 11, wherein the receiver has a structure similar to that of the laser source.

* * * * *